United States Patent [19]

Utsumi

[11] Patent Number: 5,157,647

[45] Date of Patent: Oct. 20, 1992

[54] LOADING AND UNLOADING APPARATUS FOR A CARTRIDGE

[75] Inventor: Kenichi Utsumi, Kawasaki, Japan

[73] Assignee: Fujitsu Limited, Kawasaki, Japan

[21] Appl. No.: 519,983

[22] Filed: May 7, 1990

[30] Foreign Application Priority Data

May 18, 1989 [JP] Japan .................................. 1-124996

[51] Int. Cl.⁵ ..................... G11B 33/02; G11B 23/00; G11B 25/00; G11B 5/016
[52] U.S. Cl. .................................. 369/75.2; 369/271; 360/99.02
[58] Field of Search ..................... 369/75.1, 75.2, 77.1, 369/77.2, 270, 271; 360/99.01, 99.02, 99.06, 96.5

[56] References Cited

U.S. PATENT DOCUMENTS

| | | | |
|---|---|---|---|
| 4,509,158 | 4/1985 | Kang | 369/77.2 |
| 4,546,396 | 10/1985 | Schatteman | 360/99.06 X |
| 4,694,364 | 9/1987 | Matsuda et al. | 360/99.01 |
| 4,736,357 | 4/1988 | Uehara et al. | 360/99.02 X |
| 4,862,445 | 8/1989 | Sasaki | 369/75.2 |
| 4,866,551 | 9/1989 | Kishimoto et al. | 360/99.06 X |
| 4,985,791 | 1/1991 | Yamagishi | 360/96.5 |

FOREIGN PATENT DOCUMENTS

| | | |
|---|---|---|
| A10260437 | 3/1988 | European Pat. Off. . |
| A20264139 | 4/1988 | European Pat. Off. . |
| 3644285A1 | 7/1987 | Fed. Rep. of Germany . |
| 63-53744A | 3/1988 | Japan . |

*Primary Examiner*—Stuart S. Levy
*Assistant Examiner*—Michael C. Kessell
*Attorney, Agent, or Firm*—Armstrong & Kubovcik

[57] ABSTRACT

A cartridge loading/unloading apparatus having a base, and a carrier movably supported on the base and capable of carrying a tape cartridge. The carrier with the cartridge is moved between an unloading position and a loading position by a drive motor by way of a cam member, a flexible arm, and a pivot arm. A stopper is provided for retaining the carrier at the loading position. The carrier is urged against the stopper by a deformation of the flexible arm at the loading position.

7 Claims, 8 Drawing Sheets

LOADING AND UNLOADING APPARATUS FOR A CARTRIDGE

BACKGROUND OF THE INVENTION

1. Field of the Invention

This invention relates to a cartridge loading and unloading apparatus, in which a cartridge accommodating therein a recording media, such as a recording magnetic tape, optical or magnetic disc or the like, is set on a carrier of the apparatus and moved to a loading position or is moved from the loading position to an unloading position. More particularly, this invention relates to a cartridge loading/unloading apparatus comprising an urging means which resiliently urges the carrier toward a stopper at the loading position, to stably retain the carrier at that position.

2. Description of the Related Art

A known apparatus for loading and unloading a tape cartridge comprises a base of the apparatus and a carrier into which the tape cartridge is inserted and set. The base has a pair of vertical side walls each having two substantially L-shaped guide slots. The carrier has side faces each having two pins, which are engaged with these two guide slots respectively, so that the carrier is movable in the horizontal direction while the pins are engaged with horizontal paths of the L-shaped guide slots, and movable in the vertical direction when the pins are engaged with vertical paths of the L-shaped guide slots.

A plate is extended between the above-mentioned pair of pins and is provided, at an intermediate position thereof, with another pin which is engaged with an elongated slot of a pivot arm, which is connected through a coil spring to an output shaft operatively connected to a drive motor via a suitable reduction means.

In the operation of this apparatus, first the carrier is in an upper or unloading position, and a tape cartridge is inserted and set in the horizontal direction into the carrier. When the setting of the cartridge is confirmed by a suitable sensor, the drive motor is rotated and the pivot arm is thus pivotably moved so that the carrier is guided along the vertical paths of the L-shaped guide slots until the carrier is lowered to come into contact with a stopper at a loading position.

Thereafter, the drive motor is rotated for a predetermined number of revolutions, so that the coil spring, via the pivot arm, exerts a resilient force on the carrier to urge the carrier downward against the stopper at the loading position. When the carrier is in the lower or loading position, the drive motor or the reduction means is locked by a suitable stopper to prevent a rotation of the drive motor by a counter-reaction force from the coil spring.

After the necessary information and data has been output from or input to the tape cartridge, the motor is then driven to rotate in the opposite direction, to move the carrier to the unloading position.

The above-mentioned known cartridge loading/unloading apparatus is relatively complicated, since a coil spring for urging the pivot arm toward the loading position, and a stopper for preventing a rotation of the drive motor by a reaction force from the coil spring, are necessary.

SUMMARY OF THE INVENTION

An object of the present invention is to provide a cartridge loading/unloading apparatus having a relatively simple construction and a lower cost.

Another object of the present invention is to provide a cartridge loading/unloading apparatus capable of overcoming the drawbacks mentioned above with reference to the known apparatus.

According to the present invention, there is provided a cartridge for a loading/unloading apparatus comprising a base means; a carrier movably supported on the base and able to carry a cartridge accommodating therein a recording media, the cartridge being able to be set into or removed from the carrier; and means for moving the carrier, with the cartridge set therein, between an unloading position and a loading position; characterized in that: the moving means comprises a drive source; a cam member rotatably mounted on the base and operatively connected to the drive source; a pivot arm having one end pivotably connected to the base and a free end operatively connected to the carrier; a flexible arm having a first part rigidly connected to the pivot arm and a second part remote from the first part; a stopper means for retaining the carrier at the loading position; and an engaging means for engaging the second part of the flexible arm with the cam member in such a manner that the carrier is moved between the unloading and loading positions by the drive source via the cam member, the engaging means, the flexible arm, and the pivot arm, and that the carrier is urged against the stopper by a deformation of the flexible arm at the loading position.

In the apparatus of this invention, the carrier is moved until it comes into contact with the stopper, and thereafter, the drive source continues to operate to resiliently deform the flexible arm to thereby urge the carrier against the stopper, whereby the carrier is stably retained at the loading position. While at the loading position, the cam member prevents a rotation of the drive source by a counterreaction force from the flexible arm, since the engaging means is located at a position with respect to the cam member such that the counterreaction force from the flexible arm is no longer transmitted to the drive source.

Therefore, a coil spring for urging the carrier toward the loading position and a special stopper for preventing an undesired rotation of the drive motor, as required in the above-mentioned known apparatus, are no longer necessary according to the present invention, and thus a cartridge loading/unloading apparatus having a relatively simple construction is obtained.

DESCRIPTION OF THE PREFERRED EMBODIMENTS

Figure 1:
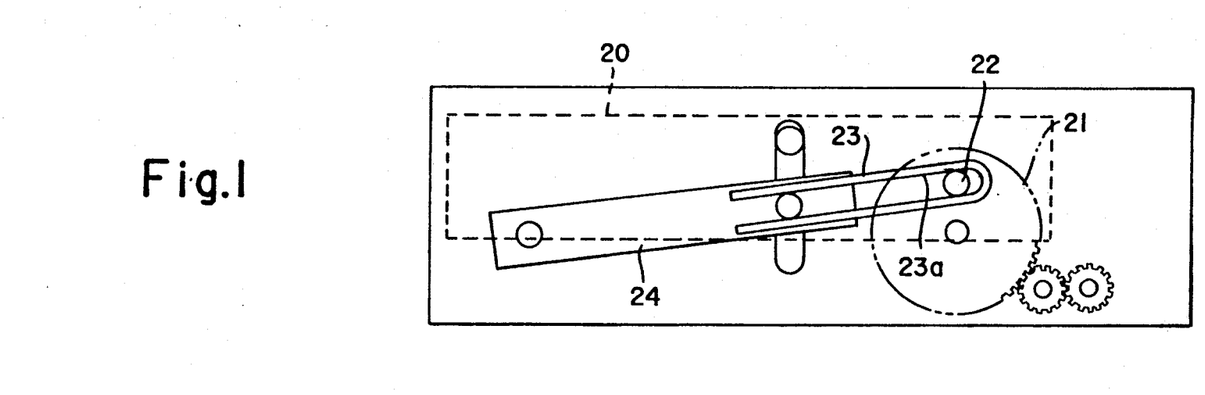
FIG. 1 is a schematic illustration of an apparatus for loading and unloading a cartridge according to the present invention.

Referring now to the drawings, wherein FIG. 1 schematically illustrates an apparatus for loading and unloading a cartridge according to the present invention, the apparatus comprises a carrier 20 to which a tape cartridge is inserted, a cam gear 21 rotated by a drive motor, a pin 22 projected from a side surface of the cam gear 21, an arm bar 23 defining an elongated hole 23a with which the pin 22 is freely engaged, and a pivot arm 24 to which the base end of the arm bar 23 is fixed, the pivot arm 24 being connected to the carrier 20 to move it upward and downward.

In the apparatus as shown in FIG. 1, when the cam gear 21 is rotated, the carrier 20 is moved upward or downward. Namely, at a cartridge loading position, the pin 22 is at its lowermost position, or in the vicinity thereof, and the arm bar 23 is resiliently deformed to push the carrier 20 downward.

Figure 2A:
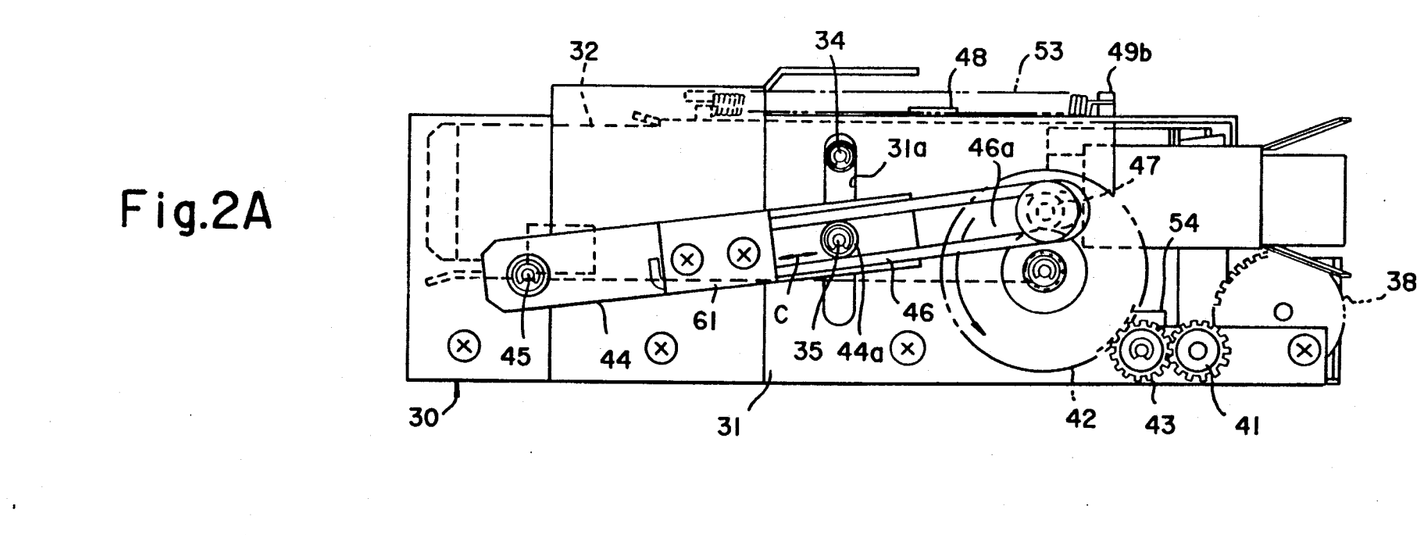
FIG. 2A-2C are a side elevational vies of an embodiment of the cartridge loading/unloading apparatus of this invention, with the carrier raised (2A), lowered (2B) and secured (2C)
Figure 2B:
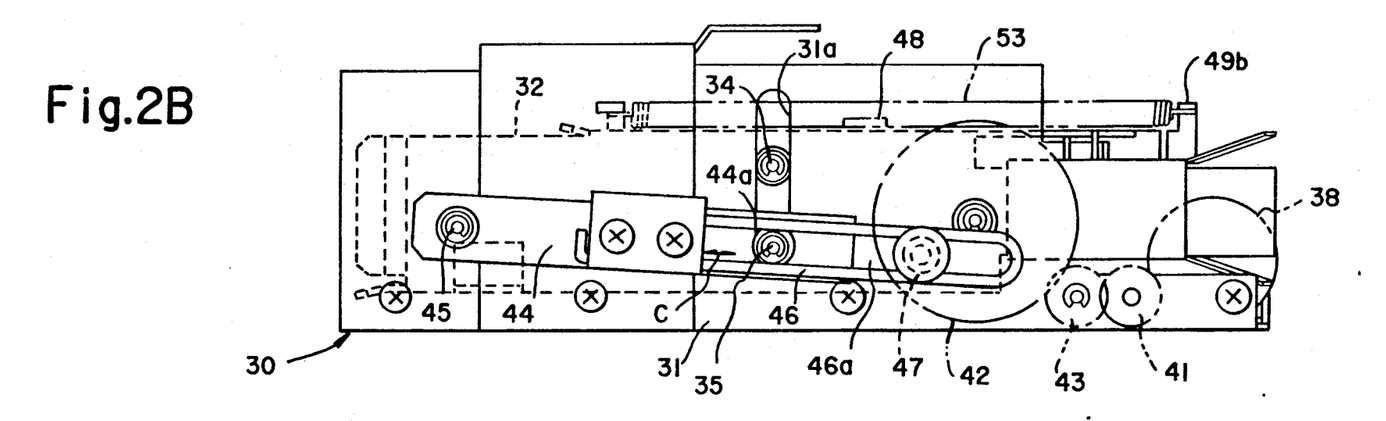
Figure 2C:
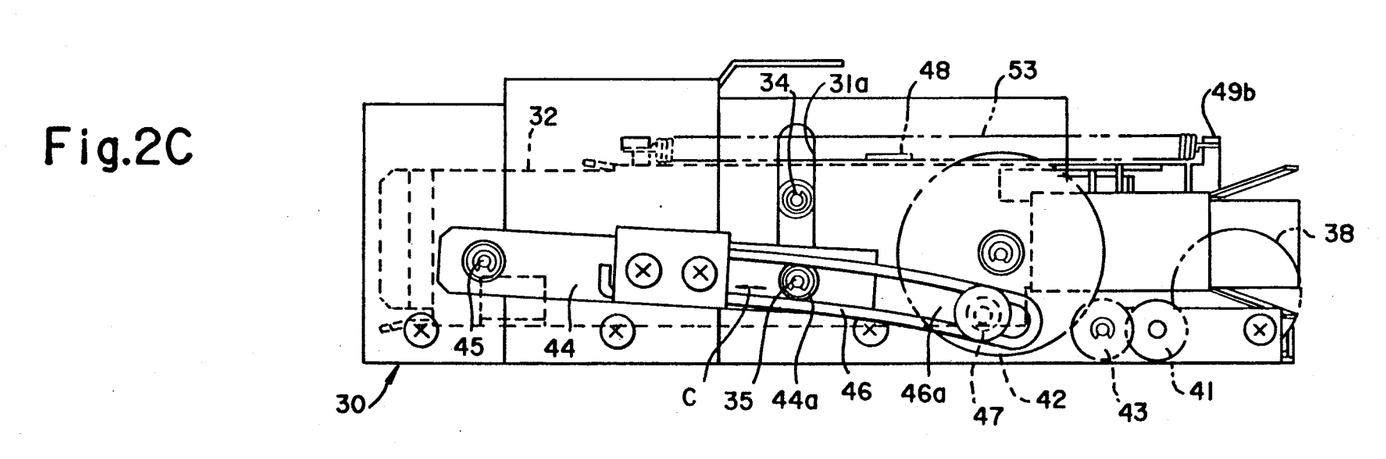
Figure 3:
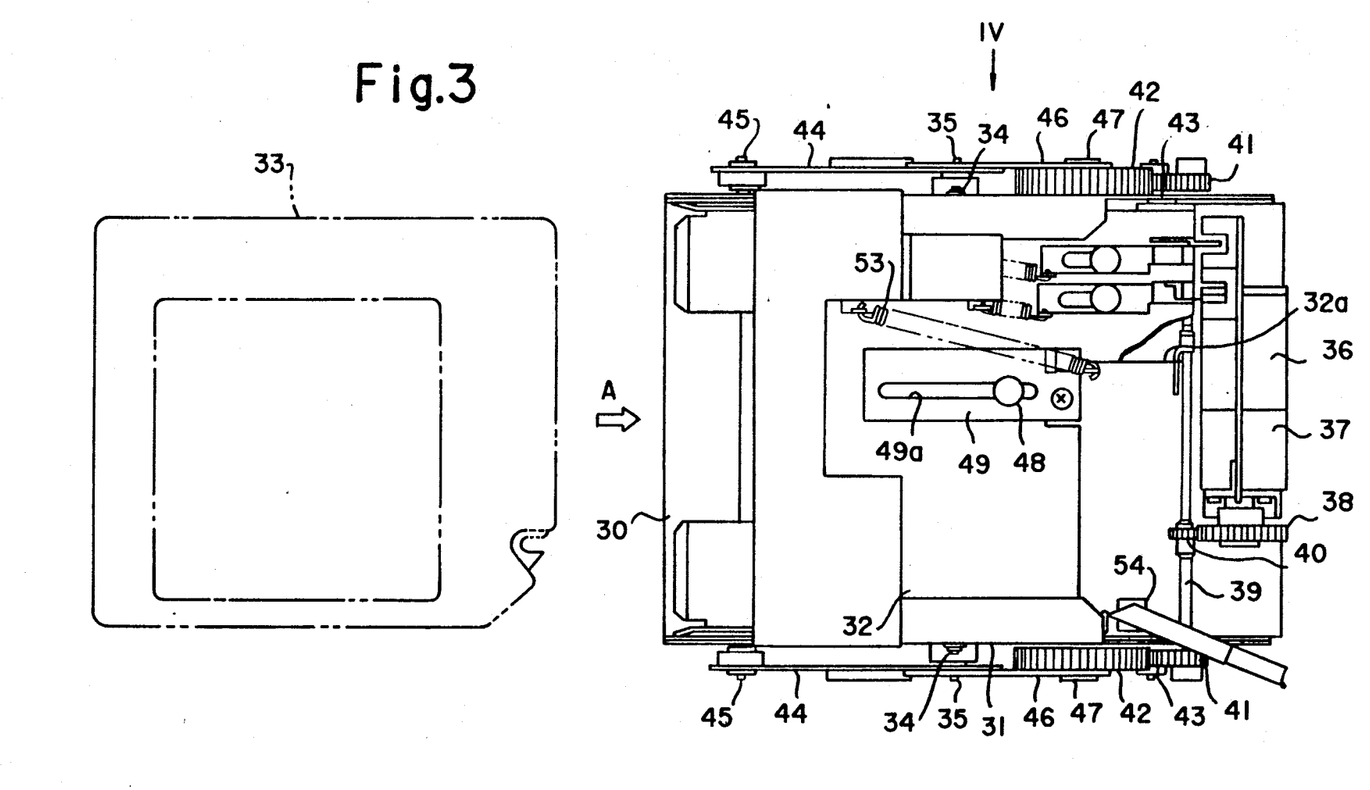
FIG. 3 is a plan view of the embodiment shown in FIG. 2.

FIG. 2 is a side elevational view of an embodiment of the cartridge loading and unloading apparatus according to the present invention, and FIG. 3 is a plan view of this embodiment. The apparatus comprises a base 30 provided at the respective sides thereof with side bases 31, and each of the side bases 31 is provided with a vertically elongated slot 31a. A carrier 32, to which a tape cartridge 33 can be inserted, has respective side walls each provided with pins 34 and 35 which are engaged with the elongated slots 31a, respectively, so that carrier 32 is prevented from moving in a direction other than the vertical direction, i.e., the direction of the elongated vertical slot 31a.

A drive motor 36 is mounted on the bottom surface of the base 30, and a reduction means 37 is connected to an output shaft of the drive motor 36. A first gear 38 is rigidly mounted on an output shaft of the reduction means 37, a shaft 39 is rotatably supported on the respective side bases 31, a second gear 40 is rigidly mounted on the shaft 39 at an intermediate portion thereof and engaged with the first gear 38, third gears 41 are mounted on the respective ends of the shaft 39, cam gears 42 are rotatably mounted on the respective side bases 31, and counter gears 43 also rotatably mounted on the respective side bases 31 are engaged with the respective third gears 41 and with the respective cam gears 42. Accordingly, the respective cam gears 42 are simultaneously rotated by the drive motor 36.

Pivot arms 44 arranged along the respective side bases 31 have base ends each pivotably connected to the side base 31 by a pin 45. Each of the pivot arms 44 is provided at a free end thereof with an elongated slot 44a with which the above-mentioned pin 35 is freely engaged, whereby the carrier 32 is moved upward and downward when the pivot arms 44 are pivotably moved about the pin 45.

Flexible arm bars 46 are secured to the respective free ends of the pivot arms 44, each arm bar 46 comprising a flexible U-shaped member which defines an elongated slot 46a. An upper portion of the U-shaped arm bar 46 is rigidly fixed to the pivot arm 44, while a lower portion of the arm bar 46 is slidably guided as an arrow C by a mounting member 61. A pin 47 is rigidly mounted on the side surface of the respective cam gear 42 and engaged with the elongated slot 46a.

Figure 4:
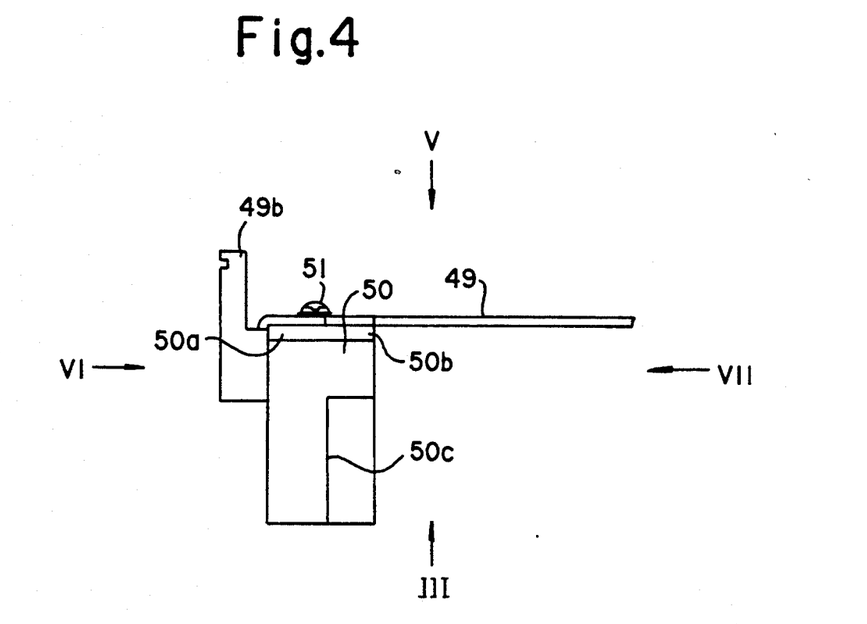
FIG. 4 is a front view of an eject member used in the apparatus shown in FIG. 2.
Figure 5:
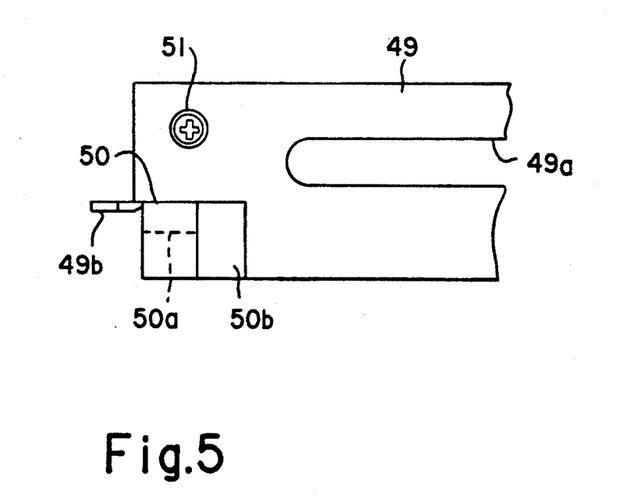
FIG. 5 is a plan view of the eject member shown in FIG. 4.
Figure 6:
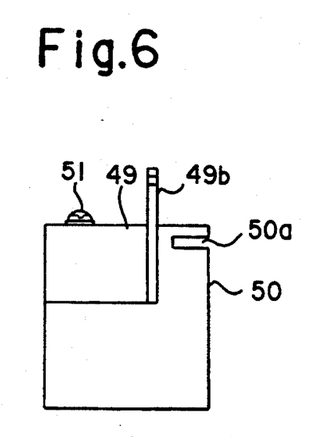
FIG. 6 is a left side view seen from an arrow VI in FIG. 4.
Figure 7:
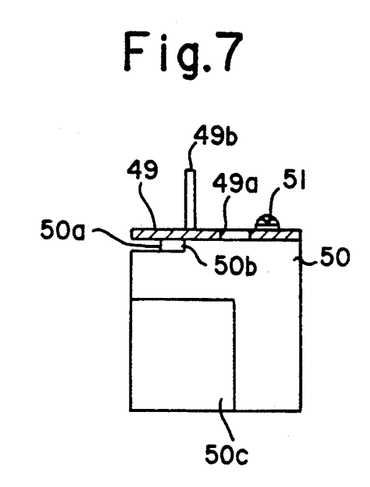
FIG. 7 is a right side view seen from an arrow VII in FIG. 4.
Figure 8:
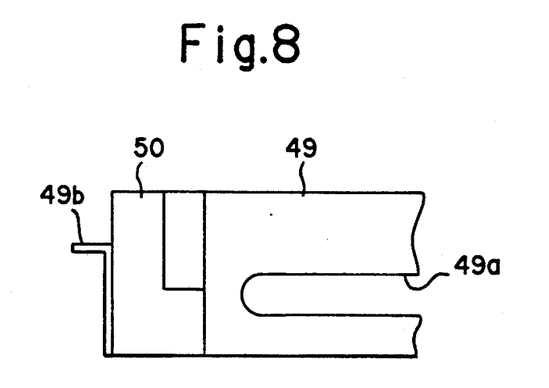
FIG. 8 is a bottom view seen from an arrow VIII in FIG. 4.
Figure 9:
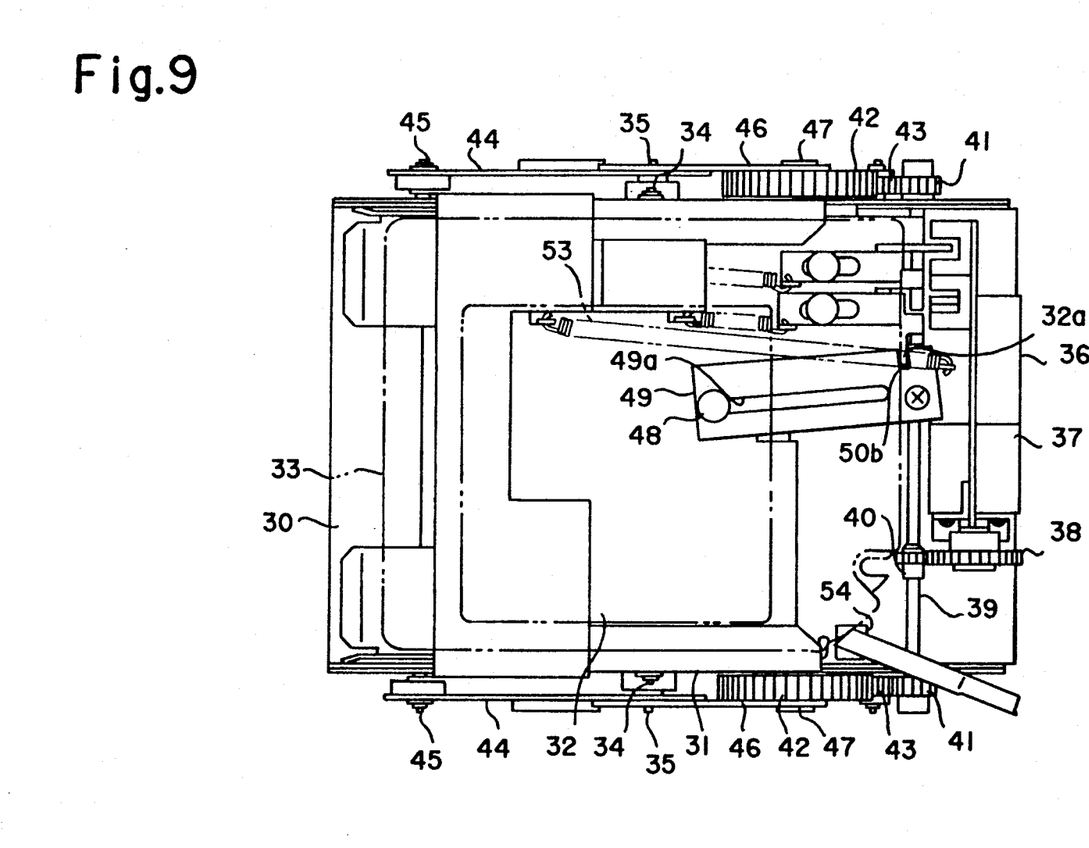
FIG. 9 is a plan view similar to FIG. 3, wherein the carrier has been moved to a loading position.

A pin 48 is rigidly mounted on the upper wall of the carrier 32. An eject member or plate 49 is provided with an elongated slot 49a extending in the direction in which the tape cartridge 33 is loaded or unloaded. The elongated slot 49a is freely engaged with the pin 48 so that the eject member 49 is movably supported in the loading/unloading direction of the cartridge 33. As shown in FIG. 4, a block 50 is rigidly connected to one end of the eject member 49 by a screw 51.

Figure 10:
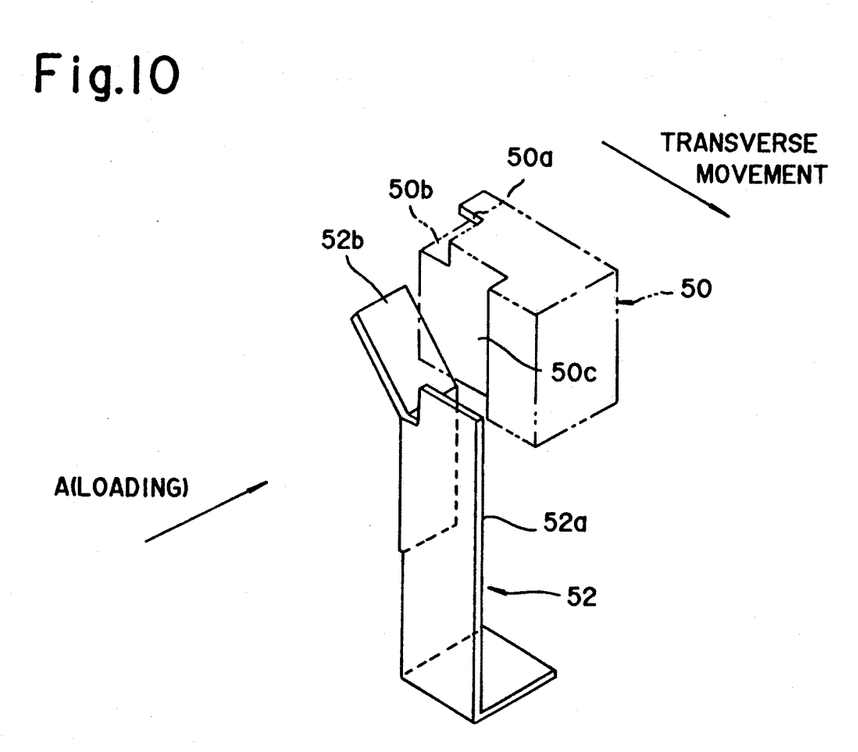
FIG. 10 is a perspective view illustrating a block and an engaging member used in the apparatus shown in FIG. 3; and, FIGS. 11A, 11B, and 11C are views illustrating the operations of the block and the engaging member shown in FIG. 10.

As shown in FIG. 10, an engaging member 52 is mounted on the base 30, and comprises a vertical guide portion 52a and an inclined guide portion 52b.

The eject member 49 and the block 50 integrally connected to the eject member 49 will now be described in more detail with reference to FIGS. 4 through 8 and 10. The block 50 is provided at one end face thereof with a guide slit 50a slidably engageable with a guide portion 32a formed on the top wall of the carrier 32, and a first engaging recess 50b adjacent to the guide slit 50a and deeper than the latter in the horizontal direction, to engage with an end of the guide 32a of the carrier 32. The block 50 is also provided at the lower part thereof with a second engaging recess 50c which comes into contact with a vertical guide portion 52a of the engaging member 52 when the carrier 32 is lowered. The eject member 49 is provided at the one end thereof with an upper projection 49b, with which one end of a spring 53 is engaged. The other end of the spring 53 is engaged with the top wall of the carrier 32, so that the eject member 49 is always urged in the unloading direction of the tape cartridge 33, i.e., the direction in which the guide slit 50a of the block 50 is pushed toward the guide portion 32a of the carrier 32.

A stopper 54 (FIG. 2) is mounted on the base 30, to stop the carrier 32 from moving downward beyond the loading position thereof.

An operation of the cartridge loading/unloading apparatus according to the present invention will now be described. In FIG. 3, the tape cartridge 33 is inserted into the carrier 32 as shown by an arrow A, and thus a leading face of the tape cartridge 32 pushes against the block 50 of the eject member 49 so that the eject member 49 is moved in the loading direction against the spring 53. Then, the first engaging recess 50b of the block 50 is engaged with the guide portion 32a of the carrier 32 by the spring 53 and, therefore, the eject member 49 is prevented from moving backward in the unloading direction, by the spring 53. FIG. 2A shows this position.

Figure 11A:
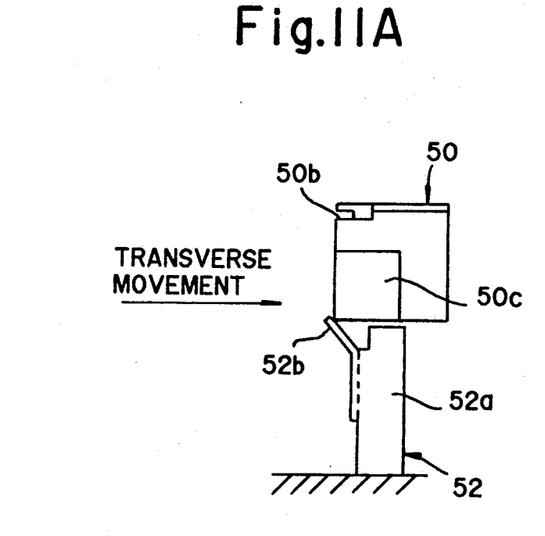
Figure 11B:
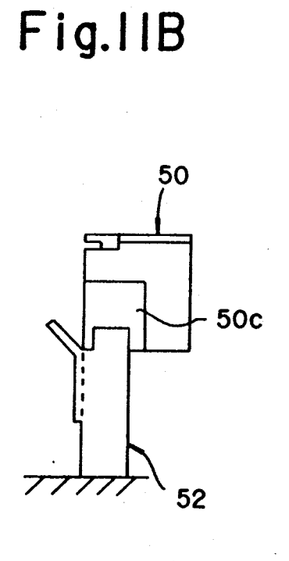
Figure 11C:
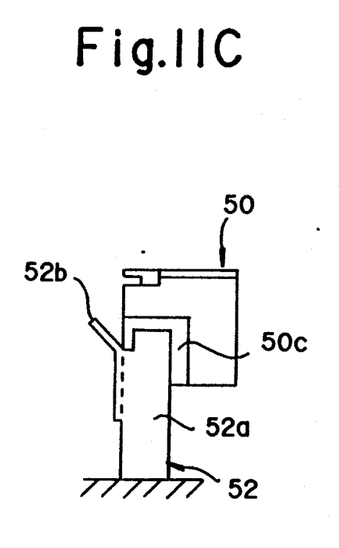

Thereafter, the drive motor 36 is operated to rotate in one direction, so that the drive force is transmitted through the reduction means 37, the first gear 38, the second gear 40, the respective third gears 41, and the respective counter gears 43, to simultaneously rotate the cam gears 42, whereby the pivot arms 44 are turned about the pins 45, and thus the carrier 32 is moved downward along the vertical elongated slot 31a. When the carrier 32 is lowered, the bottom edge portion of the block 50 comes into contact with the inclined guide portion 52b of the engaging member 52 (FIG. 11A), so that the block 50 is transversely guided in such a manner that the first engaging recess 50b thereof is disengaged from the guide portion 32a of the carrier 32. When the first engaging recess 50b is disengaged from the guide portion 32a of the carrier 32, although the eject member 49 accompanying the block 50b is apt to move in the unloading direction due to the spring 53, the second engaging recess 50c of the block 50 comes into contact with the vertical guide portion 52a of the engaging member 52 to prevent a further movement thereof in the unloading direction (FIGS. 11B and 11C).

Under such conditions, the carrier 32 is further lowered until the bottom thereof comes into contact with the stopper 54 (FIG. 2B), and thereafter, the drive motor 36 is operated for a predetermined number of revolutions, to resiliently deform the arm bar 46 and thereby urge the carrier 32 downward (FIG. 2C).

After the necessary information and data are output from or input to the recording media of the tape cartridge 33, the motor 36 is driven in the opposite direction. Accordingly, the second engaging recess 50c of the block 50 is disengaged from the vertical guide 52a portion of the engaging member 52 and, therefore, the eject member 49 accompanying the block 50b is moved in the unloading direction by the spring 53. During this movement, the block 50 pushes against the leading end face of the tape cartridge 33 to remove it from the carrier 32 in the unloading direction.

While the invention has been particularly shown and described in reference to preferred embodiments thereof, it will be understood by those skilled in the art that changes in form and details may be made therein without departing from the spirit and scope of the invention.

I claim:

1. A cartridge loading/unloading apparatus comprising:
   a base;
   a carrier means movably supported on said base for carrying a cartridge and for accommodating therein a recording media, said cartridge being able to be set into or removed from the carrier means; and
   means for moving said carrier, with said cartridge set within, between an unloading position and a loading position,
   said moving means including:
      a drive source;
      a cam member rotatably mounted on said base and operatively connected to said drive source;
      a pivot arm having one end pivotably connected to said base and a free end operatively connected to said carrier;
      a resiliently flexible arm having a first portion rigidly connected to said pivot arm and a second portion remote from said first portion, wherein said resiliently flexible arm is rigidly connected to said free end of said pivot arm forming an extended part thereof;
      a stopper means for retaining said carrier at the loading position; and
      engaging means for engaging said second portion of the flexible arm with said cam member in such manner that said carrier is moved between the unloading and loading positions by said drive source via said cam member, said engaging means, said flexible arm, and said pivot arm, and wherein said carrier is urged against said stopper by a deformation of said flexible arm at the loading position.

2. An apparatus as set forth in claim 1, wherein said flexible arm comprises a U-shaped bar having an elongated slot, said cam member having a pin projected from a side surface thereof, and said engaging means comprises said pin engaged with said elongated slot and movable therealong.

3. An apparatus as set forth in claim 2, wherein the loading and unloading positions are the lowest and uppermost positions, respectively, of said carrier, and at the loading position, said cam member is in a state such that said pin is at its lowest position, or in the vicinity thereof, to thereby resiliently deform said flexible arm to urge the carrier against the stopper means.

4. A cartridge loading/unloading apparatus comprising:
   a base;
   a carrier means movably supported on said base for carrying a cartridge and for accommodating therein a recording media, said cartridge being able to be set into or removed from the carrier means; and
   means for moving said carrier, with said cartridge set within, between an unloading position and a loading position,
   said moving means including:
      a drive motor mounted on said base;
      a cam member rotatably mounted on said base and connected to a drive source via a reduction means;
      a first engaging means formed on said cam member;
      a pivot arm having one end pivotably connected to said base and a free end operatively connected to said carrier;
      a resiliently flexible arm having a first portion rigidly connected to said free end of the pivot arm and a second portion remote from said first portion, wherein said resiliently flexible arm is rigidly connected to said free end of said pivot arm forming an extended part thereof;
      a second engaging means formed on said second portion of said flexible arm, said second engaging means engaging with said first engaging means;
      a stopper means provided on said base for retaining said carrier at the loading position in such a manner that, when said cam member is rotated in one direction, the carrier is moved from the unloading position to the loading position until the carrier is stopped by said stopper means, said cam member is further rotated in said one direction to resiliently deform said flexible arm so as to urge the carrier against the stopper means, and the carrier is moved toward the unloading position when said cam member is rotated in the opposite direction.

5. An apparatus as set forth in claim 4, wherein said flexible arm comprises a U-shaped bar forming an elongated slot, said cam member having a pin projected from a side surface thereof, and said first and second engaging means comprises said pin and said elongated slot, respectively, engaged with respect to each other so that said pin is freely movable along said elongated slot when the cam member is rotated.

6. An apparatus as set forth in claim 5, wherein the loading and unloading positions are the lowest and uppermost positions, respectively, of aid carrier, and at the loading position, said cam member is in a state such that said pin is at its lowest position, or in the vicinity thereof, to thereby resiliently deform said flexible arm to urge the carrier against the stopper means.

7. An apparatus as set forth in claim 5, wherein said base has a pair of side walls;

a pair of said cam member are rotatably mounted on said respective side walls;

a pair of said pivot arms each having one end pivotably connected to said respective side wall and a free end operatively connected to said carrier; and a pair of resiliently flexible arms each having a first portion rigidly connected to said free end of the respective pivot arm and a second portion remote from said first portion; and said pairs of cam members, pivot arms, and flexible arms being arranged symmetrically with respect to the base.

* * * * *